R. W. STEARNS.
CONDENSER.
APPLICATION FILED OCT. 24, 1916.
1,349,792.
Patented Aug. 17, 1920.
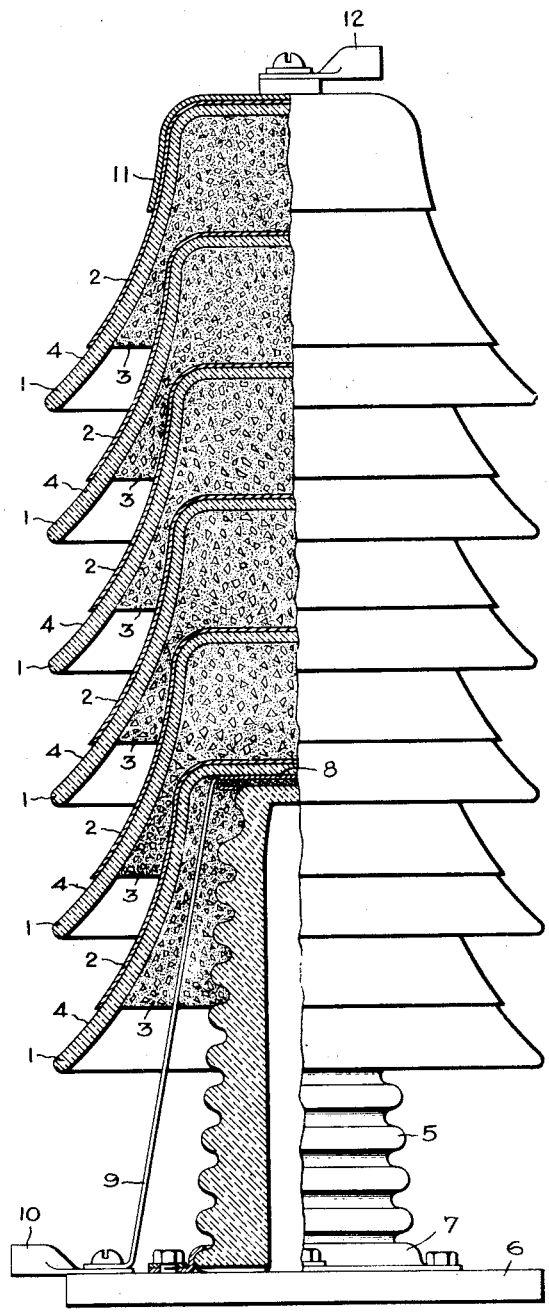
Inventor:
Ralph W. Stearns,
by [signature]
His Attorney.

UNITED STATES PATENT OFFICE.

RALPH W. STEARNS, OF SCHENECTADY, NEW YORK, ASSIGNOR TO GENERAL ELECTRIC COMPANY, A CORPORATION OF NEW YORK.

CONDENSER.

1,349,792.   Specification of Letters Patent.   Patented Aug. 17, 1920.

Application filed October 24, 1916. Serial No. 127,480.

*To all whom it may concern:*

Be it known that I, RALPH W. STEARNS, a citizen of the United States, residing at Schenectady, in the county of Schenectady, State of New York, have invented certain new and useful Improvements in Condensers, of which the following is a specification.

My invention relates to condensers and more particularly to condensers adapted for use as protective devices in high potential electrical distribution systems.

It has been found in practice that an electrostatic condenser with resistance in series therewith furnishes an efficient means for the protection of high potential electrical distribution systems and the apparatus connected thereto from the effects of high frequency disturbances which may arise in the system from various causes. In order to secure this protective effect the condensers and series resistances must be connected between the individual conductors of the distribution system or between each conductor and ground. The condensers employed should have such a capacity that they will offer a comparatively high impedance to current of the normal frequency, but a comparatively low impedance to any high frequency currents which are produced in the distribution system. As a result but little current will pass through the condensers in the normal operation of the system and the energy lost will be small. When, however, a high frequency disturbance arises in the system comparatively large high frequency currents will flow through the condensers and a large part of the energy of the high frequency disturbance will be dissipated in the form of heat in the series resistance. In carrying such a protective system into practice difficulty has been experienced because of the high cost of condensers which are capable of withstanding the voltages which may be impressed thereon as well as in the selection of resistances which will be suitable for the desired purpose.

The object of my invention is to provide a condenser suitable for the above purpose which will be comparatively cheap and simple in its manufacture and a novel method of constructing the same. A further object of my invention is to provide a condenser with such a high internal ohmic resistance that the energy of the high frequency current will be dissipated in passing through the condenser thus avoiding the necessity of using a separate resistance in series with the condenser. Still another object of my invention is to provide a condenser which will be suitable for outdoor use without any special means for protecting it from the action of the elements.

In carrying my invention into effect I employ for electrodes a conducting material having comparatively high ohmic resistance in comparison with the metallic conductors usually employed, the thickness of these electrodes being so proportioned that the completed condenser will have the desired internal ohmic resistance.

The features of my invention which I consider novel are pointed out with particularity in the appended claims. The invention itself, however, together with further objects and advantages will best be understood by reference to the following description taken in connection with the accompanying drawing in which I have shown partly in section and partly in elevation one form of my invention.

The device here shown is made up of a plurality of superimposed elements each of which comprises a hollow member 1 of glass, other vitreous material, or other dielectric material preferably having a high specific inductive capacity. The upper surfaces of the dielectrics are covered with a metallic coating 2 and the lower surfaces are covered with a conductive concrete mixture 3. The edges of the hollow dielectrics are preferably flared outwardly at 4 in order to provide a large creepage surface between adjacent electrodes of different potential. The conductive mixture may consist of suitable proportions of Portland cement, sand and lampblack, powdered coke, graphite or other form of carbonaceous material. One mixture which I have found satisfactory for my purpose consists of 30% lampblack, 50% sand and 20% cement, and has a specific resistance per cubic inch when dry of about 11,800 ohms. The proportions of the mixture of course may be varied to give any degree of resistance or conductivity desired. In assembling the condenser the dielectrics with the metal coatings thereon may be inverted and held apart the desired distance by suitable spacers while the conducting concrete in plastic form is poured into the space between the dielectrics and allowed to harden. The completed condenser may be supported upon an insulator 5 which is embedded in the concrete mixture of the bottom element, this insulator in turn being secured to the base 6 by means of a clamping ring 7. Connection to the lower electrode of the condenser may be made by means of a metal disk 8 embedded in the concrete mixture and connected by the lead 9 to the terminal 10. Connection to the top electrode of the condenser may be made by means of the cap 11 which is shaped to fit the electrode 2 and is securely fastened thereto, a suitable terminal 12 being fastened to this cap.

It will be apparent from the above description that the current flowing through the condenser has to pass through the layers of conducting concrete which serve in part as electrodes and that by varying the thickness of these layers as well as by varying the proportions of the mixture the internal resistance of the condenser may be given any value desired. While with the form of my device which I have illustrated I find it desirable to employ the metal coatings 2 on the upper surface of the dielectric, this is not necessary as the electrodes may be composed entirely of the high resistance material. When the device is built up in the manner shown and described the high resistance electrode will adhere firmly to the metallic electrode of the adjacent element and the elements will thus be securely held in fixed relation to each other.

I have described my condenser with special reference to its use as a protective device but it is by no means limited in its usefulness to this particular purpose as by varying the shape of the dielectrics and the thickness and proportions of the concrete mixture a high voltage condenser may be constructed with comparatively low internal resistance which will be suitable for other purposes and will be comparatively cheap and simple in its manufacture.

What I claim as new and desire to secure by Letters Patent of the United States, is:

1. A condenser comprising a dielectric of vitreous material and electrodes consisting in part at least of concrete containing conductive material.

2. A condenser comprising a dielectric and electrodes consisting in part at least of non-conducting material which has been rendered conductive by the admixture therewith of finely divided conductive material.

3. A condenser comprising a dielectric and electrodes consisting in part at least of concrete which has been rendered conductive by the admixture therewith of finely divided carbonaceous material.

4. A condenser comprising a dielectric of vitreous material and electrodes consisting in part at least of non-conducting material which has been rendered conductive by the admixture therewith of finely divided carbonaceous material.

5. A condenser having a high internal ohmic resistance to high frequency alternating currents.

6. A condenser having electrodes composed of material having a high ohmic resistance.

7. A condenser having electrodes composed of insulating material which has been changed into a high resistance conductor by the admixture therewith of finely divided conductive material.

8. An electrical apparatus of the class described comprising a solid dielectric and electrodes on opposite sides of said dielectric and in intimate contact therewith, at least one of said electrodes being composed of material having a high ohmic resistance.

9. A protective device for electrical distribution systems comprising a plurality of superimposed condenser elements each of which comprises a dielectric and an electrode composed of material having a high ohmic resistance.

10. A protective device for electrical distribution systems comprising a plurality of superimposed condenser elements, each of which comprises a dielectric having a metallic electrode on one side thereof and an electrode on the opposite side composed of a material of comparatively high ohmic resistance with respect to the metallic electrode.

11. A protective device for electrical distribution systems comprising a plurality of superimposed condenser elements, each of which comprises a dielectric having a metallic electrode on one side thereof and an electrode on the opposite side composed of a material of comparatively high ohmic resistance, the elements all being held in fixed relation to one another by the adherence between metallic electrodes and high resistance electrodes of adjacent elements.

12. A condenser comprising a plurality of superimposed hollow dielectrics separated by layers of conductive material of high resistance.

13. A condenser comprising a plurality of superimposed hollow dielectrics separated by layers of non-conducting material which has been rendered conductive by the admixture therewith of finely divided conductive material.

14. A condenser comprising a plurality of superimposed hollow dielectrics separated by layers of concrete which has been rendered conductive by the admixture therewith of finely divided carbonaceous material.

15. The method of constructing a condenser which consists in superimposing in spaced relation to one another a plurality of hollow dielectrics, filling the spaces between adjacent dielectrics with a wet plastic material which is conductive when dry and allowing the material to dry and harden, and thereby hold the dielectrics in fixed relation to one another.

In witness whereof I have hereunto set my hand this 23rd day of October, 1916.

RALPH W. STEARNS.